United States Patent
Price et al.

(10) Patent No.: US 9,131,269 B2
(45) Date of Patent: Sep. 8, 2015

(54) METHOD AND APPARATUS FOR FREEZING A VIDEO STREAM ON A DIGITAL TELEVISION DISPLAY SUCH THAT THE FRAME FREEZE POINT IS BEFORE THE VIEWER INITIATES THE EVENT

(75) Inventors: William Pat Price, Rhome, TX (US); Peter J Schwartz, Fullerton, CA (US); Marcus P Apitz, Yorba Linda, CA (US)

(73) Assignee: Vizio Inc., Irvine, CA (US)

( * ) Notice: Subject to any disclaimer, the term of this patent is extended or adjusted under 35 U.S.C. 154(b) by 1838 days.

(21) Appl. No.: 12/194,418

(22) Filed: Aug. 19, 2008

(65) Prior Publication Data

US 2010/0050209 A1    Feb. 25, 2010

(51) Int. Cl.

| | |
|---|---|
| *H04H 60/33* | (2008.01) |
| *H04N 5/445* | (2011.01) |
| *H04N 21/44* | (2011.01) |
| *H04N 5/44* | (2011.01) |
| *H04N 5/76* | (2006.01) |
| *H04N 5/783* | (2006.01) |
| *H04N 21/422* | (2011.01) |
| *H04N 21/433* | (2011.01) |
| *H04N 21/45* | (2011.01) |
| *H04N 21/845* | (2011.01) |
| *H04N 19/61* | (2014.01) |
| *H04N 21/475* | (2011.01) |
| *H04N 9/804* | (2006.01) |
| *H04N 21/442* | (2011.01) |

(52) U.S. Cl.
CPC ....... *H04N 21/44004* (2013.01); *H04N 5/4448* (2013.01); *H04N 5/76* (2013.01); *H04N 5/783* (2013.01); *H04N 19/61* (2014.11); *H04N 21/42204* (2013.01); *H04N 21/4333* (2013.01); *H04N 21/4532* (2013.01); *H04N 21/8455* (2013.01); *H04N 9/8042* (2013.01); *H04N 21/44222* (2013.01); *H04N 21/4755* (2013.01)

(58) Field of Classification Search
CPC ................. H04N 2005/4444; H04N 21/4532; H04N 21/4755
USPC ................................................. 725/45, 46, 9
See application file for complete search history.

(56) References Cited

U.S. PATENT DOCUMENTS

| | | | |
|---|---|---|---|
| 4,528,585 A | 7/1985 | Bolger | |
| 4,914,516 A | 4/1990 | Duffield | |
| 5,194,954 A | 3/1993 | Duffield | |
| 6,295,094 B1 * | 9/2001 | Cuccia | 348/559 |
| 6,850,691 B1 * | 2/2005 | Stam et al. | 386/350 |
| 2004/0073918 A1 * | 4/2004 | Ferman et al. | 725/34 |
| 2005/0086692 A1 * | 4/2005 | Dudkiewicz et al. | 725/46 |

* cited by examiner

*Primary Examiner* — Nasser Goodarzi
*Assistant Examiner* — Michael Hong
(74) *Attorney, Agent, or Firm* — Law Office of Scott C. Harris, Inc.

(57) ABSTRACT

A viewer of a digital television trying to freeze the video at a particular frame. Generally the human delay and the delay introduced by the remote control device and the control software executing on the television results in the frame that is displayed by the freeze event is some number of frames or seconds after the frame that the viewer wanted frozen. A small amount of memory that constantly buffers several seconds of digital video such that once the viewer initiates the freeze event the frame that is displayed is effectively some seconds in the past. The viewer then has the ability to single frame step to the frame that he actually was interested in viewing. The viewer's actions are refined by a rules based algorithm that allows it to more closely target and display what it believes will be the final frame the viewer wanted to be displayed.

13 Claims, 7 Drawing Sheets

METHOD AND APPARATUS FOR FREEZING A VIDEO STREAM ON A DIGITAL TELEVISION DISPLAY SUCH THAT THE FRAME FREEZE POINT IS BEFORE THE VIEWER INITIATES THE EVENT

FIELD OF THE INVENTION

The present invention relates to digital televisions and recording of digital video streams.

BACKGROUND OF THE INVENTION

Viewers of digital televisions that receive their signal from over the air or directly from a cable often have no recording equipment attached to their televisions.

Prior art exists for the estimation of position in a recorded video stream while the stream is being played back under viewer control and the viewer has transitioned to fast forward or fast reverse and initiates a play state. U.S. Pat. No. 6,850,691 specifically teaches methods to correct overshoot; where the viewer initiates a play state and because of human delays in pressing the play button on a remote control device, the point that the video stream begins playing is not the point the viewer wanted. 691 specifically identifies the transitions where the invention is to be used. These may include entering play state after fast forward or reverse. 691 teaches several methods for determining the correction factor. These include: predicting where the transition to play should start by adding a fixed offset to the play resume point, learning from the viewer's corrections to the play resume point after play mode starts, allowing the viewer to set a sensitivity to the correction offset, and testing of the viewer's reaction time.

U.S. Pat. No. 6,295,094 Cuccia teaches a methodology for instant replay including freeze frame. 094 teaches the storage of compressed video frames to maximize the use of solid state memory. This methodology includes an area of memory used for storage of metadata where each metadata tag points to the start of a video frame. The metadata tag includes the frame type (I, B, P) and if the frame type is not an I-frame, the location of the nearest I-frame. When the viewer initiates an instant replay event, an offset to the current frame of 1800 frames adjusted to the nearest I-frame, is generated and video frames starting at that frame are sent to the decoder. Adjustment to the nearest I-frame ensures that the video starts cleanly with a full frame and no picture macro blocking. 094 makes no provision for the viewer to adjust the replay point nor for stepping forward or backward once the replay event has been initiated.

U.S. Pat. No. 4,914,516 Duffield teaches a methodology for automatically presenting a single smaller picture on top of a larger television background picture or a series of pictures arranged as a matrix of various numbers of rows and columns. '516 teaches this methodology using a single analog tuner and sampling and digitizing circuitry that stores the digitized pictures in a solid state memory module. '516 teaches the technique of multiplexing a single analog tuner with 3 auxiliary video input sources such that the viewer has the option of selecting a secondary source as the picture to be presented as the picture in picture. The solid state memory is scanned and converted into signals compatible with presenting onto the screen of the television. '516 hence addresses the issues of capturing single frames from analog television.

U.S. Pat. No. 5,194,954 Duffield teaches an improved methodology over that presented in 516 for automatically presenting a matrix on the television screen with a single picture from a number of different channels. 954 gives the viewer the capability of building a scan list of favorite channels that will be presented in the picture-in-picture matrix. 954 methodology effectively freezes a single frame from each channel. 954 teaches the technique of commanding an analog tuner to tune to a channel and once the signal is stable, sampling and digitizing the signal into solid state memory. The solid state memory is scanned and converted into signals compatible with presenting onto the screen of the television. 954 addresses the issues of capturing single frames from analog television broadcasts.

U.S. Pat. No. 4,528,585 Bolger teaches a technique for sampling and digitizing a series of analog frames into solid state memory then mathematically processing the image contained in the memory for the purpose of magnifying a portion of the image contained in the memory. 585 effectively freezes successive frames of analog television such that a magnified portion of those pictures presented on the television screen remain in a magnified state.

SUMMARY OF THE INVENTION

Embodiments disclose freezing a single frame of digital video presented on a digital television and giving the viewer the ability to step to the exact frame of video that was selected. An embodiment is self learning such that the more times a viewer initiates the freeze action the closer the frozen frame will be to the desired frame.

An embodiment is for digital televisions that have the ability to pause or freeze frame video streams. Digital televisions typically do not have recorder capabilities like TIVO players, DVD players, or VCR players. The present invention does not attempt to teach freeze frame methodologies for these devices. The present invention teaches a method of automatically stopping a video stream at the point the user intended by constantly adjusting the freeze point depending on the viewer's past history of frame stepping after a freeze/pause event, the actual viewer, and the genre of the program being watched.

An embodiment describes freezing or pausing the video and allowing the viewer to step forward or backward once the freeze event has been initiated. When the invention transitions back to play the first frame to be decoded is always an I-frame but the invention does not rely on stored frames or inserted metadata to locate the starting I-frame.

BRIEF DESCRIPTION OF THE DRAWINGS

Embodiments of the present invention are illustrated by way of example, and not by way of limitation. The following figures and the descriptions both brief and the detailed descriptions of the invention refer to similar elements and in which:

FIG. 2 is a diagram illustrating a basic circular ring buffer with a buffer pointer that dictates where the next entry in the buffer is written to or read from.

DESCRIPTION OF PREFERRED EMBODIMENTS

An embodiment describes MPEG-2 video streams. MPEG-2 is but one of currently popular video streams. Another being H.264 also known as MPEG-4 Part 10. All of the digital video streams are constructed as packetized blocks of video data. The following discussion describes MPEG-2 digital video streams. The techniques described in the following are applicable to any of the digital video streams with changes to accommodate the different types and sequences of blocks or packets.

MPEG-2 based digital video streams contain sequences of video frames/block/packets referred to as a Group Of Pictures (GOP). These GOPs are composed of frame types:

I-frame (intra coded picture) reference picture, corresponds to a fixed image and is independent of other picture types. Each GOP begins with this type of frame.

P-frame (predictive coded picture) contains motion-compensated difference information from the preceding I- or P-frame.

B-frame (bidirectionally predictive coded picture) contains difference information from the preceding and following I- or P-frame within a GOP.

GOP sizes generally fall into sizes of 12 or 15. Other GOP sizes are used for either lower bit rate video such as would be used in animated programs or higher bit rate or frame rates as might be used in professional sports such as racing, football, or other high motion video programs.

Figure 1:
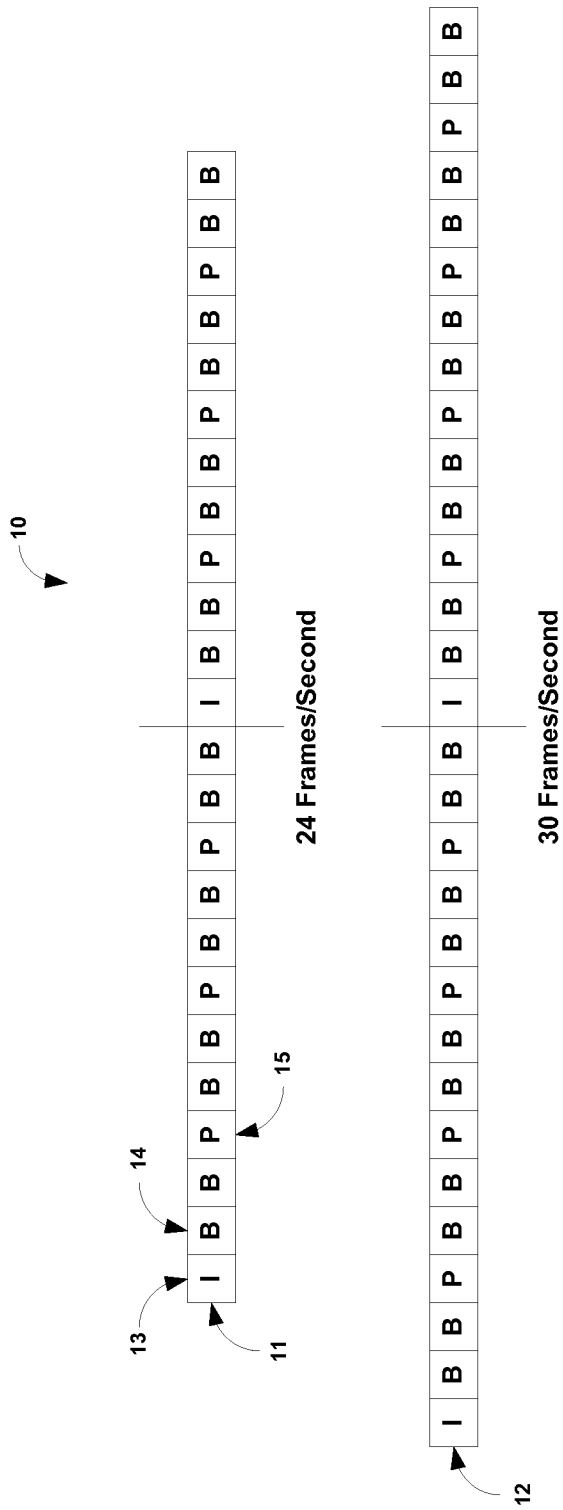
FIG. 1 is a diagram depicting two generic Group Of Pictures (GOP) for MPEG GOPs of 24 and 30 frames. Each of the GOPs shown contain 1 second of frames.

FIG. 1 shows GOPs 10. A GOP size of twelve is shown as 11 which contains twelve frames in the sequence shown. Two GOPs of size twelve will be displayed over a period of one second. Note that both GOP 11 and 12 are made up of the same sequence of I, P, and B frames. All GOPs start with a sequence of I-B-B then change to a sequence of P-B-B. The difference between a GOP of size 12 and a GOP of size 15 is one additional sequence of P-B-B.

Figure 2:
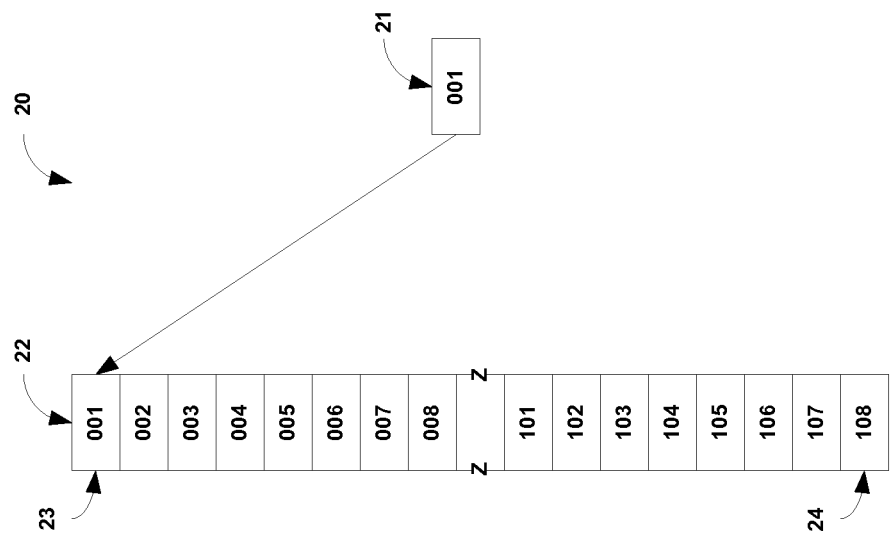

Now referencing FIG. 2 where 20 illustrates a ring or circular buffer. In this example a ring buffer 22 of 108 slots or positions is presented where first slot 001 (23) through last slot 108 (24) is shown. For the sake of clarity, slots 9 through 100 are not shown. Memory Pointer 21 contains the address of the next slot that will be written or read. In this case Memory Pointer 21 contains the address of 001 which is the next slot to be written which in this illustration is slot 001 (23). Ring buffers are useful for storing data where the data becomes "old" or not important after some period of time measured in actual time or in data quantity.

An algorithm is used to determine the next slot to be written or read. After the current slot addressed by Memory Pointer 21 is written or read, the address in Memory Pointer 21 is incremented by 1. In this illustration, after the first slot 001 (23) has been written or read, Memory Pointer 21 will be incremented from 001 to 002. This sequence will continue until Memory Pointer 21 contains an address of 108 which is the last slot 23 of the buffer. When the last slot 23 is either written or read, the algorithm managing Memory Pointer 21 will set the contents of Memory Pointer 21 to the first slot 001 (23). This action allows a finite linear area of memory to be treated as if it were a circular buffer.

Figure 3:
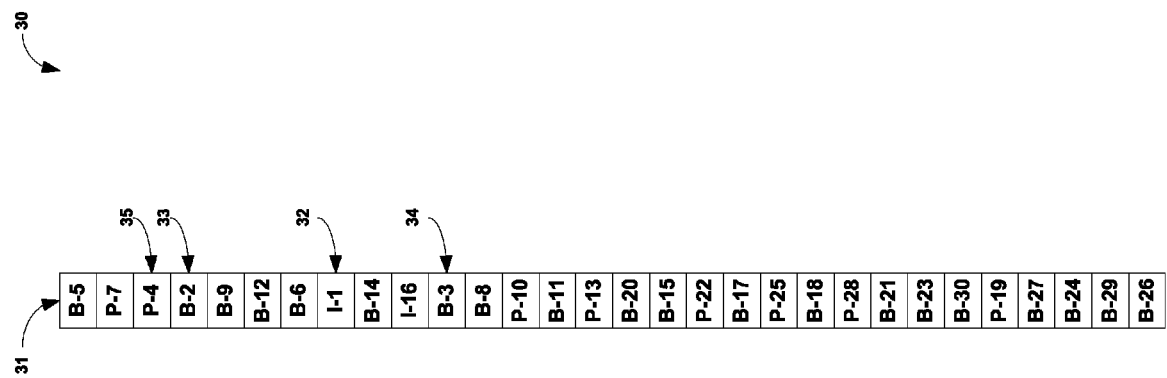
FIG. 3 is a diagram of 2 15 frame GOPs with the order of the frames out of sequence which is the typical case.

Referencing FIG. 3, 31 represents 2 GOPs of 15 frames each. The difference in this representation is that the frames are not in presentation order (I-B-B-P-B-B-P-B-B-P-B-B-P-B-B). There is no requirement for the frames to be transmitted in presentation order and MPEG transport streams may carry multiple program streams. If all of the frames not associated with a particular program stream are filtered out the remaining frames for the program will typically be in non-presentation order. Note that FIG. 3 shows that the first frame to be presented to decoder mechanism 114 is I-1 (32) followed by B-2 (33), B-3 (34), P-4 (35) and so on. Decoders are generally designed such that multiple GOPs can be retained in storage so that all of the frames for the current GOP are accessible.

Figure 4:
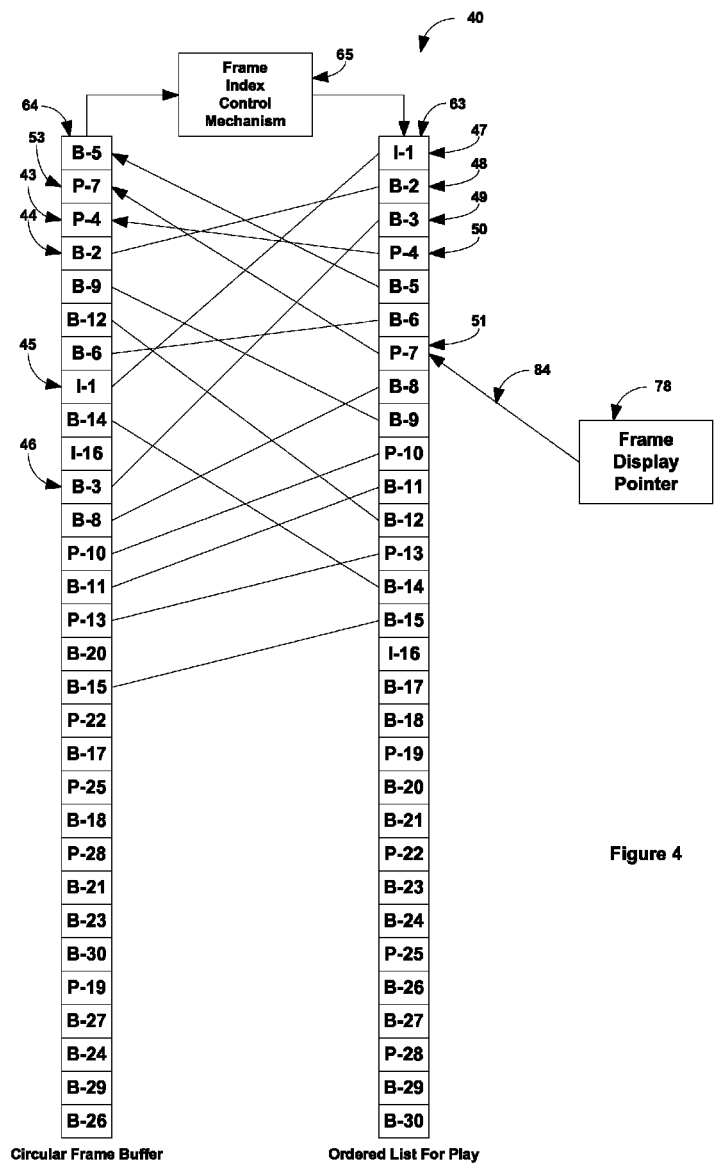
FIG. 4 is a diagram of 2 15 frame GOPs with a pointer list that is ordered such that the frames as received can be sent to a decoder in the correct sequence.

One implementation of the invention includes a mechanism 40 depicted in FIG. 4. Circular buffer 64 is shown which receives MPEG video frames that are not in presentation order. Ordered list 63 is a set of pointers to frames contained in circular buffer 64. Note that the first 4 entries in ordered list 63 are for frames I-1 (47), B-2 (48), B-3 (49), and P-4 (50). These entries form a presentation order for frames in circular buffer 64 which are I-1 (45), B-2 (44), B-3 (46), and P-4 (43). Frame display pointer 78 is shown as currently pointing to frame pointer P-7 (51) contained in ordered list 63 and pointing to frame P-7 (53) contained in circular buffer 64. Frame index control mechanism 65 is the mechanism that translates the physical order of frames in circular buffer 64 into ordered list 63. This portion of the implementation allows for simplified decoder designs where the decoder memory requirements are smaller than a design where the decoder requires memory at least large enough to contain multiple GOPs.

Figure 5:
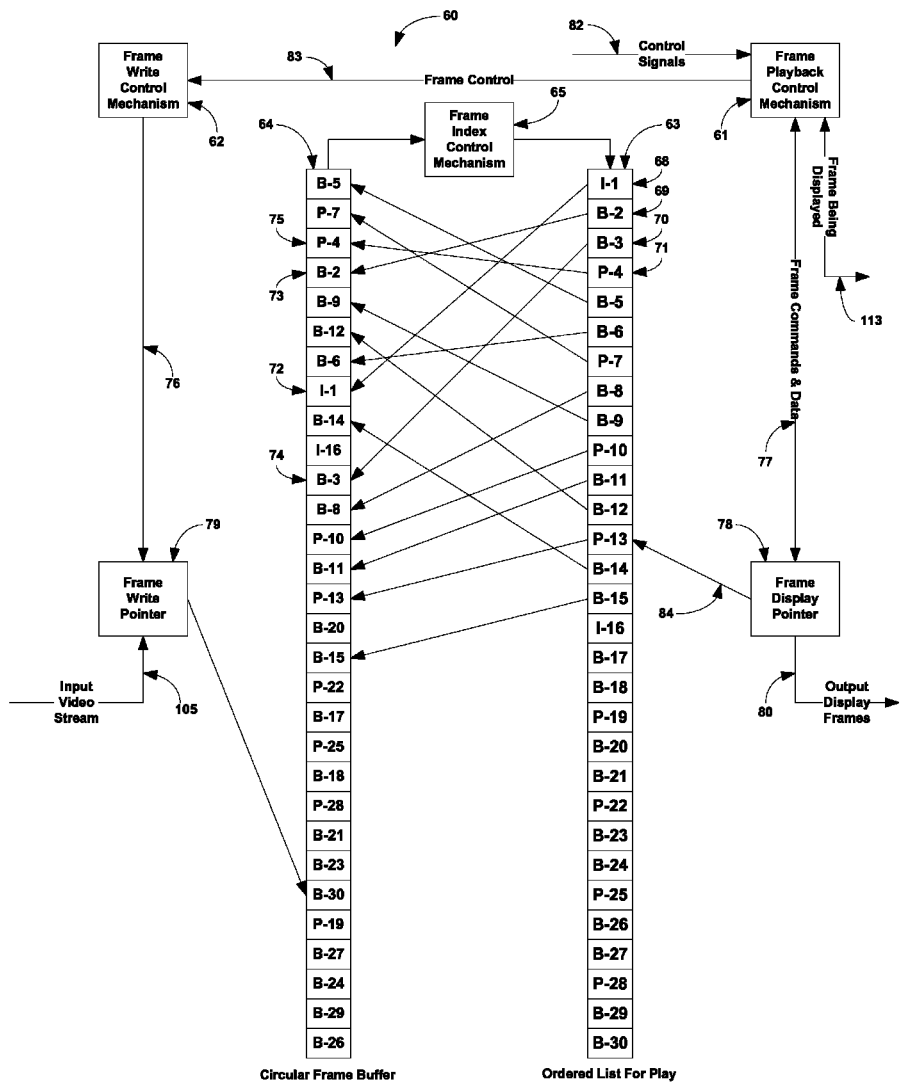
FIG. 5 is a diagram of a frame buffer control mechanism where a Frame Write Pointer places frames into a buffer in the order they are received, a Frame Index Control Mechanism maintains a order list of the received frames, a Frame Display Pointer allows frames to be removed in the correct sequence for display, and a Frame Write Control Mechanism that manages the Frame Write Pointer and a Frame Playback Control Mechanism that manages the Frame Display Pointer.

Now referencing FIG. 5, a depiction showing that portion of the invention that receives MPEG video frames as input video stream 105. Frame write pointer 79 receives input video stream 105 and writes the frames to circular frame buffer 64. Frame write pointer 79 manages the pointer transition when the last slot in circular frame buffer 64 is written and the pointer is reset to the first slot in frame buffer 64.

Frame index control mechanism 65 (FIG. 4) is the mechanism that translates the physical order of frames in circular frame buffer 64 into ordered list for play 63. Frame display pointer 78 passes frames in play order to decoder mechanism 114 as output display frames 80.

Control signals 82 contains command sequences (pause/freeze, step forward, step backward, play, display frame 'n') that initiate a pause/freeze of input video stream 105 being sent to decoder mechanism 114 and the frame number of the pause/freeze frame to be sent to decoder mechanism 114. When the viewer presses the pause button, intelligent control module 91 (FIG. 7) formulates the command sequence and the pause/freeze frame number, and sends these command and data as control signals 82 to frame playback control mechanism 61 and video stream multiplexer 106 contained within decoder mechanism 114. In the current embodiment, frame playback control mechanism 61 sends a command via frame control 83 to frame write control mechanism 62 to stop writing frames from input video stream 81 into circular frame buffer 64. This ensures that the frame that will be sent to decoder mechanism 114 by frame display pointer 78 will not be overwritten if the pause/freeze event lasts longer than the amount of time required to overwrite circular frame buffer 64 with new frames.

The frames can be stored in a memory, e.g., an internal memory, or an external memory such as a USB device.

Frame playback control mechanism 61 sends the frame number to be displayed to frame display pointer 78 as frame commands and data 77 and will send subsequent frame numbers to frame display pointer 78 if the viewer wants to step forward and backward to reach his desired frame. When frame playback control mechanism 61 receives a pause/freeze command from control signals 82, it will send a request to the digital video stream decoder 107 via frame being displayed 113 requesting the frame ID for the frame currently being displayed. The digital video stream decoder 107 returns the ID of the frame currently being displayed via frame being displayed 113. Frame playback control mechanism 61 uses frame display pointer 78 to scan the presentation order of the frames contained in circular frame buffer 64 to locate the frame identified as the frame currently being displayed. Once the frame currently being displayed is located, frame playback control mechanism 61 examines the header of the frame to determine if the frame is an I-frame. If the frame is an I-frame, frame playback control mechanism 61 will direct frame display pointer 78 to send that frame to decoder mechanism 114 as output display frames 80. Frame playback control mechanism 61 sends a command to digital video stream decoder 107 directing it to decode, display and hold the frame. If the frame is not an I-Frame, frame playback control mechanism 61 will backup frame display pointer one frame at a time and examine the header for each frame until it finds the previous I-frame. Once the previous I-frame has been located, frame playback control mechanism 61 will direct frame display pointer 78 to send that I-frame and the frames between the I-frame and the original freeze frame to the decoder mechanism 114 and will send commands via frame being displayed 113 to digital video stream decoder directing digital video stream decoder 107 to decode the sequence and display and hold the last frame in the sequence.

If the viewer subsequently presses the step forward button on remote control device 96, control signals 82 will present a step forward command to frame playback control mechanism 61. Frame playback control mechanism 61 will then send a frame advance command over frame commands and data 77 to frame display pointer 78. Frame display pointer 78 will advance presentation frame pointer 84 to the next frame. Frame display pointer 78 will send that frame to the decoder as output display frames 80. Frame playback control mechanism 61 will then send a decode frame, display and hold command via frame being displayed 113 to digital video stream decoder 107.

If the viewer subsequently presses the step backward button on remote control device 96, control signals 82 will present a step backward command to frame playback control mechanism 61. Frame playback control mechanism 61 will use frame display pointer 78 to scan the reverse presentation order of the frames contained in circular frame buffer 64 and examine the header for each frame until it finds the previous I-frame. Once the previous I-frame has been located, frame playback control mechanism 61 will direct frame display pointer 78 to send that I-frame and the frames between that I-frame and the frame before the currently displayed frame to the decoder mechanism 114. Frame playback control mechanism 61 will send the commands to digital video stream decoder 107 via frame being displayed 113 directing digital video stream decoder 107 to decode the frame sequence and display and hold the last frame in the sequence. If the previous frame is an I-frame then playback control mechanism 61 will direct frame display pointer 78 to send that frame to decoder mechanism 114. Frame playback control mechanism 61 will send the command to digital video stream decoder 107 via frame being displayed 113 directing digital video stream decoder 107 to decode, display and hold that frame.

If the viewer presses the play button, control signals 82 presents a play command to frame playback control mechanism 61 and to video stream multiplexer 106 contained within decoder mechanism 114. Video stream multiplexer 106 switches its inputs such that input video stream 105 is passed through to digital video stream decoder 107. Frame playback control mechanism 61 will send a command via frame control 83 to frame write control mechanism 62 to begin writing frames received as input video stream 105 to circular frame buffer 64. Frame playback control mechanism 61 sends a command to digital video stream decoder 107 via frame being displayed 113 directing digital video stream decoder 107 to begin decoding frames but not to display the frames. Frame playback control mechanism 61 will then send a request to digital video stream decoder 107 via frame being displayed 113 requesting the frame type for the frame currently being decoded. Digital video stream decoder 107 will return the frame type to frame playback control mechanism 61. Frame playback control mechanism 61 will continue with the query/response cycle until the frame type that is returned by digital video stream decoder 107 indicates that the current frame being decoded is an I-frame. When that event occurs, frame playback control mechanism 61 will send a command via frames being displayed 113 to digital video stream decoder 107 directing it to begin displaying decoded frames. This cycle allows the play event to occur starting with an I-frame ensuring that the display will not present macro blocked video.

Figure 6:
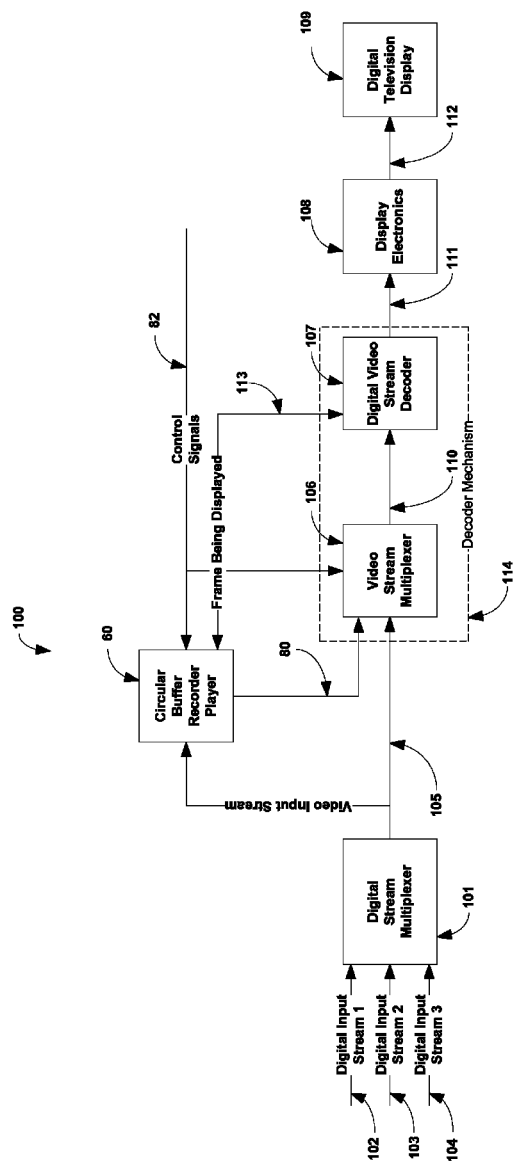
FIG. 6 is a diagram depicting the overall control mechanism for pausing a video stream in the television at the correct point once the viewer presses the pause or freeze button his remote control device.

Now referencing FIG. 6, a basic overview 100 of the invention is depicted. Digital stream multiplexer 101 manages 3 input streams as digital input stream 1 (102), digital input stream 2 (103), and digital input stream 3 (104). Digital stream multiplexer 101 will only allow one of these 3 digital input streams to pass through at any time. Video input stream 105 is sent to circular buffer recorder player 60 and video stream multiplexer 106 contained within decoder mechanism 114.

Circular buffer recorder player 60 contains a circular frame buffer and the control mechanisms to manage the pause/freeze events received from control signals 82. Decoder mechanism 114 contains video stream mechanism 106 and digital video stream decoder 107. Video stream multiplexer 106 receives commands from control signals 82 directing it to select input video stream 105 or output display frames 80 to pass through to digital video stream decoder 107. Digital video stream decoder 107 receives commands via frame being displayed 113 directing it to perform a plurality of specific actions such as decode frame, display frame, hold frame, and decode sequence of frames and hold. Digital video stream decoder 107 also receives requests for a plurality of data such as frame type for frame currently being decoded and frame ID for frame currently being displayed. Decoder mechanism 114 sends decoded video stream 111 to display electronics 108. Display electronics 108 send display signals 112 to digital television display for presentation on the display screen.

Figure 7:
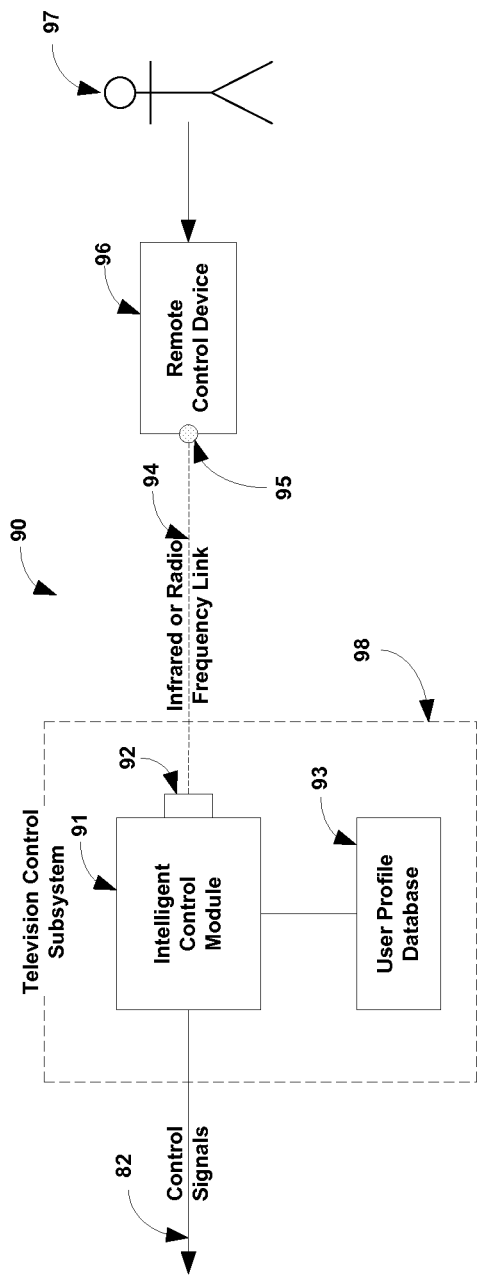
FIG. 7 is a diagram depicting the viewer and the viewer's hand held remote control device and the control module that decode commands sent by the viewer and computes an offset for the pause point in the MPEG video stream based on the viewer's past behavior.

Now referencing FIG. 7, viewer 97 presses buttons on remote control device 96. Remote control device 96 may send command sequences by any of a plurality of means such as Infrared, Radio Frequency, Laser, or any other transmission means to television control subsystem 98. Remote control device sends these command sequences via emitter 95 as infrared or radio frequency link 94.

All of these kinds of command sequences are received by receiver 92 and passed to intelligent control module 91 in television control subsystem 98. Television control subsystem 98 includes a user profile database 93. This database may host a plurality of data records including multiple records containing user profiles for each user/viewer of the television. These profiles may be ordered by parental control attributes or other attributes. Each user/viewer of the television may have a unique profile. For those situations where each user/viewer has their own profile, the intelligent control module will model the behavior of each user/viewer such that when a given user/viewer is watching the television and presses a pause/freeze button the number of frames to backup before pause/freeze will be modeled for that user/viewer.

When intelligent control module 91 receives a pause/freeze event from the user/viewer, it will access user profile database 93 to first determine who the user/viewer is, and will then access that user/viewer's profile. The profile can store information about what the user is likely wanting when they press a button. For example, this may be used to determine the number of frames to backup prior to initiating the pause/freeze event. Intelligent control module 91 then formulates a command sequence containing the pause/freeze command and the number of frames to backup. The command sequence and data are sent to frame playback control mechanism 61 as control signals 82. Frame playback control mechanism 61 then executes the pause/freeze command sequence.

If the user/viewer presses the step forward button after a pause/freeze event has been processed, intelligent control module 91 will formulate a command sequence to step forward 1 frame. The step forward command sequence and data are sent to frame playback control mechanism 61 as control signals 82. Frame playback control mechanism 61 then executes the step forward 1 frame command sequence.

If the user/viewer presses the step backward button after a pause/freeze event has been processed, intelligent control module 91 will formulate a command sequence to step backward 1 frame. The step backward command sequence and data are sent to frame playback control mechanism 61 as control signals 82. Frame playback control mechanism 61 then executes the step backward 1 frame command sequence.

If the user/viewer presses the play button after a pause/freeze event has been processed, intelligent control module 91 will formulate a command sequence to play. The play command sequence and data are sent to frame playback control mechanism 61 as control signals 82. Frame playback control mechanism 61 then executes the play command sequence.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A digital television system comprising:
   television content receiving part receiving television content;
   a processing unit, receiving user commands, and producing outputs indicative thereof, said commands relating to actions for the television content;
   a database containing a user profile data having multiple different user profiles, each user profile for a different viewer of the television, where each user profile is automatically compiled to model a behavior of each of the users based on prior user commands including sent user commands and those commands said user might send subsequent to the current command, said processing unit determining a sequence of commands to cause said processing unit to preemptively create and send control signals relating to television content based on additional commands previously sent by a user, without the user sending said additional commands, where one of said user commands is a freeze frame command to freeze a frame of said television content that is being displayed, and where said processing unit automatically determines a number of frames to back up based on actions a first user of the users has taken after previous freeze frame commands, where said database contains information of a genre of the current program being viewed and changes a location where the frame is frozen based on the genre.

2. A system as in claim 1, wherein said processing unit is a microprocessor driven by software commands.

3. A system as in claim 1, further comprising display electronics, which produces a signal to drive a digital television display based on said television content and said control signals.

4. A system as in claim 1, further comprising a buffer memory used for video stream buffering and control stored in a portion of volatile memory used by the microprocessor for general purposes such as software and data.

5. A system as in claim 1, wherein said commands are received from a hand held digital television remote control device.

6. A system as in claim 1, where the received user commands are received over a wireless network connection.

7. A system as in claim 1, where said database contains information indicating subsequent commands which have been sent to said specific devices for each of a plurality of genres of said current program being viewed.

8. The system as in claim 1, wherein after the previous freeze frame commands command, the processing unit receives a command to step backwards, and automatically reverses through a frame buffer that stores frames of video information to find frames that are previous to a currently held frame, and automatically determines how many frames to back up based on how many commands to step backwards are received.

9. A method comprising:
receiving television content;
receiving user commands related to said television content;
storing user profile data having multiple different user profiles, each user profile for a different viewer of the television, where each user profile is automatically compiled to model a behavior of each of the users based on prior user commands that a user has sent, and follow up information about what the user sent as subsequent commands to the received commands; and
based on the received commands, and said user profile data, producing other commands relating to actions for the television content, said other commands including a sequence of commands automatically created based on a received user command and based on said user profile data, the user profile being based on additional commands previously sent by a user, and the sequence of commands being automatically created based on the stored user profile data, where one of said user commands is a freeze frame command to freeze a frame of said television content that is being displayed, and where said processing unit automatically determines a number of frames to back up based on actions that a first user of the users has taken after previous freeze frame commands,
where said storing user profile data stores information indicative of genres, and said producing other commands changes a location where the frame is frozen based on a genre of the current program being viewed and based on said information indicative of genres in said user profile data.

10. A method as in claim 9, further comprising producing a signal to drive a digital television display based on said television content and said control signals.

11. A method as in claim 9, where said database contains information indicative of a genre of the current program being viewed.

12. The method as in claim 9 where said user profile information indicates subsequent commands which have been sent to said specific devices for each of a plurality of genres of said current program being viewed.

13. A method as in claim 11, where said database contains information indicating subsequent commands which have been sent to said specific devices for each of a plurality of genres of said current program being viewed.

* * * * *